United States Patent [19]
Pacht

[11] Patent Number: 5,224,686
[45] Date of Patent: Jul. 6, 1993

[54] VALVE ASSEMBLY FOR HIGH PRESSURE WATER SHUT-OFF GUN

[75] Inventor: Amos Pacht, Houston, Tex.

[73] Assignee: Butterworth Jetting Systems, Inc., Houston, Tex.

[21] Appl. No.: 825,469

[22] Filed: Jan. 24, 1992

Related U.S. Application Data

[63] Continuation-in-part of Ser. No. 579,804, Sep. 7, 1990, abandoned, which is a continuation-in-part of Ser. No. 467,257, Jan. 19, 1990, abandoned.

[51] Int. Cl.⁵ .............................................. F16K 39/02
[52] U.S. Cl. ..................................... 251/282; 277/27; 277/205; 239/583
[58] Field of Search .................. 251/282; 277/27, 205; 239/583

[56] References Cited

U.S. PATENT DOCUMENTS

| | | | |
|---|---|---|---|
| 1,320,944 | 11/1919 | Thoens | 251/282 |
| 1,861,916 | 6/1932 | Hennebohle | 251/282 |
| 3,037,740 | 6/1962 | Sheps et al. | 251/282 |
| 3,086,565 | 4/1963 | Mosher | 251/282 X |
| 3,140,830 | 7/1964 | Ingold | 251/282 X |
| 3,294,362 | 12/1966 | Schultz et al. | 251/282 X |
| 3,304,048 | 2/1967 | Roberts | 251/282 X |
| 3,527,507 | 9/1970 | Clark et al. | 277/205 X |
| 4,519,616 | 5/1985 | Johnston | 277/205 X |

Primary Examiner—John Rivell
Attorney, Agent, or Firm—Jones, Day, Reavis & Pogue

[57] ABSTRACT

A shut-off valve assembly in a very high pressure water gun is provided with a valve member between a pressure chamber and an outlet chamber which produces a quick pressure induced snap-off action just before closing which securely seats the valve member against leakage and erosion. Shortly after cracking the valve to an open position the pressure induced force is relieved and the regular biasing spring offers the only closing force. An improved high pressure seal is configured to seal with a short stem contact area designed to significantly reduce friction. A special safety bleeder valve bleeds to atmosphere independent of starting pressure.

16 Claims, 4 Drawing Sheets

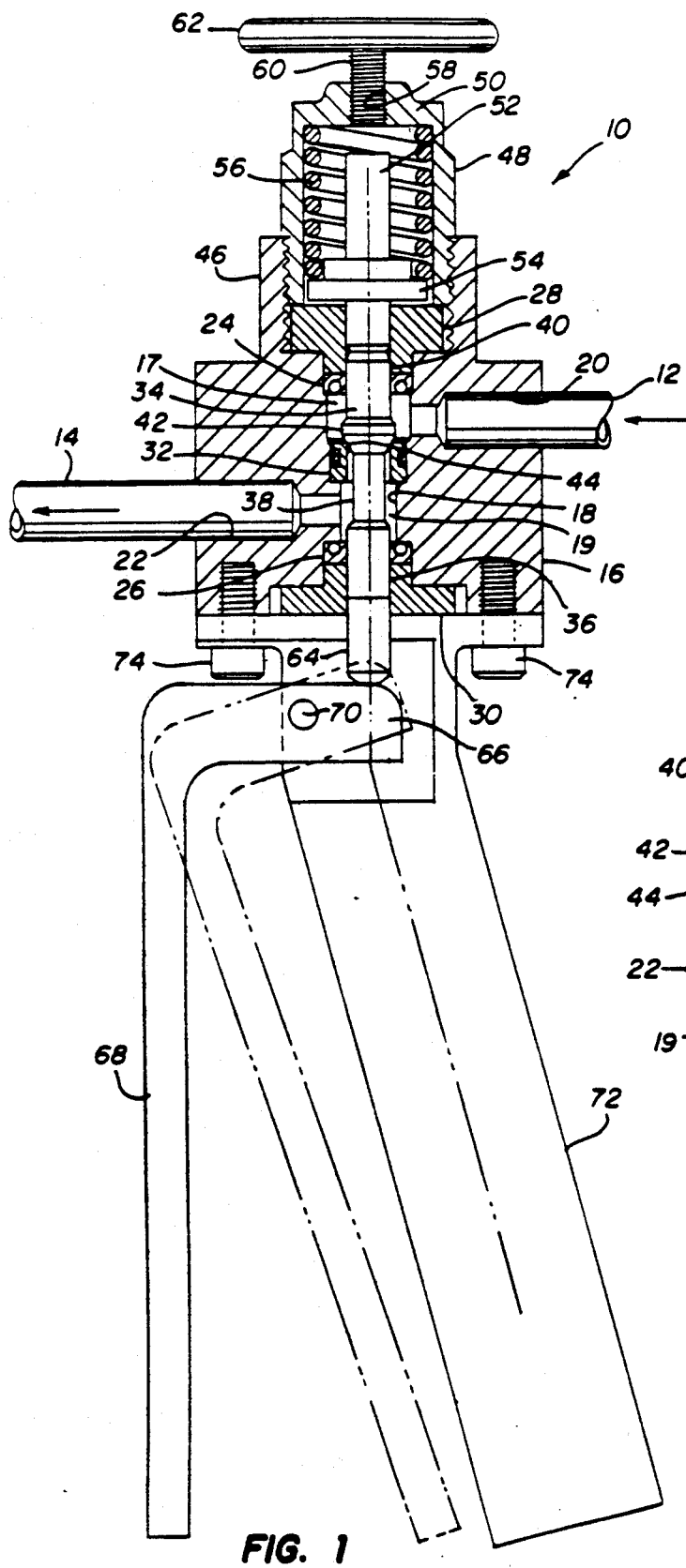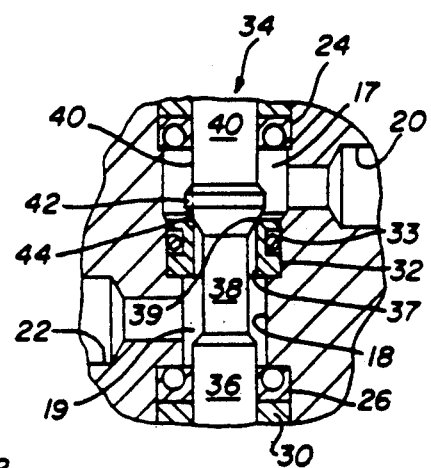
FIG. 1
FIG. 2

VALVE ASSEMBLY FOR HIGH PRESSURE WATER SHUT-OFF GUN

This is a continuation-in-part of copending application Ser. No. 579,804 filed on Sep. 7, 1990 now abandoned, which was a continuation-in-part of Ser. No. 467,257 filed on Jan. 19, 1990, now abandoned.

BACKGROUND OF THE INVENTION

The present invention relates generally to the control of high pressure fluid, and more particularly relates to a uniquely operative high pressure water shut-off gun which advantageously eliminates the previous necessity of dumping high pressure supply water to atmosphere during the often quite extended periods in which high pressure water is not being operatively discharged through the gun's outlet nozzle.

High pressure shut-off guns are conventionally utilized at the discharge end of a high pressure water delivery line to selectively control the operative discharge of the high pressure water to a nozzle portion of the gun which may be communicated with the high pressure water via an internal valve mechanism disposed within the gun body and actuated by a trigger lever member pivotally secured to the gun body. In the design of high pressure water shut-off guns of this general type, it has heretofore been conventional practice to provide for the dumping to atmosphere of the high pressure water through an auxiliary, relatively large opening when the gun's spray nozzle is not being used.

This dumping of the high pressure water during idle nozzle periods has been previously necessary, among other reasons, to prevent undesirably accelerated wear imposed on the internal control valve mechanism by the high pressure water.

In this context high pressure is generally pressure in excess of one thousand pounds per square inch (psi), more particularly five thousand psi and above to as high as twenty thousand psi or even higher. Anything over one thousand psi is considered quite dangerous because of the force it can exert and the velocities of fluids propelled by such high pressures. Valves which are cracked slightly open or which develop minor leakages are quickly destroyed by erosion caused by internal flow even at low flow rates.

It has additionally been thought necessary to maintain this continuous dumping of high pressure water to atmosphere during idle periods of the gun's spray nozzle to reduce the static pressure at the outlet of the system water supply pump to prevent the pump from working against a dead head created by the closed gun valve mechanism. However modern pumps and pumping systems do not prohibit deadheading.

As might be imagined, this previous necessity of continuously dumping high pressure water for lengthy periods is extremely wasteful. It would therefore be highly desirable to provide a high pressure water shut-off gun of the general type described in which the dumping of high pressure water to atmosphere was eliminated. It is accordingly an object of the present invention to provide such a high pressure water shut-off gun.

High pressure water guns must have high pressure seals which operate to seal the valve assembly from the high pressure while permitting sliding sealing contact with the valve stem. The valve stem operates the primary valve shut-off means which controls the flow between a high pressure inlet chamber and a discharge chamber leading to the nozzle of a gun, which is subject to the undesirable accelerated wear referred to previously. Because of the tight fit between the high pressure seals and the sliding operating stem of the valve mechanism, the high pressure seals tightly surround the valve stem and substantial frictional forces are thereby encountered. These frictional forces tend to cause the seals to distort or "lockup" tightly against the valve stem shaft which restricts its movement.

Although a biasing spring tends to bias the valve stem to a closed position of the valve member in the valve seat to close the pressure chamber and shut-off the flow, the biasing force supplied by the spring is at its minimum because of spring extension when the valve assembly is in the shut-off position. Frictional drag on the valve stem caused by the high pressure seals tends to prevent the primary valve member from seating fully against the valve seat thereby accentuating the erosion problem. If a stronger biasing spring is used to operate the valve stem toward the closed position, then it becomes uncomfortably difficult for the operator to hold the valve assembly open against the stronger spring. Therefore another object of the invention is to provide a pressure induced closing force which operates when the valve member is very near the seat but which does not operate when the valve member is moved slightly away from the seat, permitting the operator to hold the valve assembly open against only the biasing spring force in the open position. An improved seal having reduced resistance to movement of the valve stem with less tendency to distort or lockup on the valve stem shaft is a further object of the invention.

Because of the danger involved in the operation of high pressure guns, an additional object of the invention is to provide a safety lock to permit the operator locking the gun with the valve assembly positioned in the closed orientation and to provide a separate bleeder valve to bleed pressure from the supply line if the gun is shut-off while the pressure is still applied after the supply pump is turned off. Conventional bleeder valves tend to allow excessive bleeding during operation at high pressure, tend to clog and because of pressure induced strains, cause premature shut-off of the bleeder valve function at a pressure which is still dangerous. It is an object of the invention to provide an improved bleeder valve which does not exhibit this characteristic and bleeds consistently down to essentially zero pressure.

SUMMARY OF THE INVENTION

In carrying out principles of the present invention, in accordance with a preferred embodiment thereof, a high pressure water shut-off gun is provided for operative connection to the outlet end of a high pressure water supply conduit. The gun has a body with an internal passageway therein which opens outwardly through the body via an outlet passage operatively connectable to a suitable water discharge nozzle, and an inlet opening operatively connectable to the discharge end of a high pressure water supply conduit or the like. A manually operable trigger lever member is pivotally secured to the gun body and is operable to actuate a valve assembly means disposed within the internal passageway of the gun body, the valve means being operable to selectively create or terminate a flow of high pressure water from the supply conduit to the discharge nozzle of the shut-off gun. The valve means disposed within the internal gun body is specially designed to snap closed securely and is supported to continuously withstand the high pressure of the system water during extended periods in which the valve means are in their closed position and high pressure water is not being discharged through the gun nozzle. Due to the special design of these valve means, the previous necessity of continuously dumping high pressure system water during idle periods of the nozzle is eliminated.

In a preferred embodiment of the shut-off gun of the present invention, the valve assembly includes a tapered, generally annular valve member carried on a stem axially movable in response to manual pivoting of a trigger lever member to shift the stem longitudinally within the internal gun body passageway between an open position, and a closed position in which the valve member seats against a valve seat which separates the passageway into a pressure chamber with a supply inlet and a discharge chamber with a discharge outlet.

At an upper portion of the gun body, spring means operate upon the stem to bias the valve member toward its closed position. The valve stem is slidingly mounted for limited axial movement within the passageway, an upper portion of the valve stem passing out of the pressure chamber through an upper high pressure seal, a lower portion of the stem passing out of the discharge chamber through a lower high pressure seal and an intermediate portion of the valve stem portion passes through the valve seat. The valve seat has an annular seating area for receiving a tapered seating portion of a valve member carried by the intermediate portion of the valve stem for sealing the pressure chamber from the discharge chamber.

The valve seat and valve member are configured to have an effective seal area which generates significant abrupt sealing force as the valve member closes under pressure, said sealing force continuing while the pressure is maintained and being manually removable abruptly to an insignificant level with respect to the biasing spring as the valve member is moved away from the valve seat by manual force applied to the lower portion of the valve stem. When the trigger lever member is depressed to move the valve stem upwardly, the water pressure is equalized on both sides of the valve member, due to the special configuration thereof. The equal diameters of high pressure seal members where they slidingly engage the stem above and below the valve member result in a balance of axial pressure induced force on the valve stem itself, so that the only net longitudinal axial force on the valve stem is that exerted thereon by the biasing spring means after the valve member is moved away from the seat. Accordingly, the valve stem, and the valve member fixedly secured thereto, are in a relatively balanced condition when the valve member is moved to its open position to permit throughflow of the high pressure water from the valve body inlet passage and to the discharge nozzle via the internal gun body passageway.

The pressure induced axial force on the valve member is directed in a closing direction of the valve member with the valve seat. As soon as the valve member is moved even a small distance away from the valve seat under pressure, the pressure is equalized around the valve member and it no longer exerts a significant closing force on the valve member and valve stem. Thus when the valve member is in the open position the operator can comfortably maintain it in that position for operation because only the biasing force of the spring must be overcome by of the operation trigger of the gun. However when the valve member very closely approaches the seat, the configuration of the valve member and the valve seat diameter together with the relative diameter of the valve stem results in a significant unbalanced force directed in the closing direction on the valve member which snaps the valve member closed against the seat. Conversely, when the significant axial force on the valve member created by the unbalanced pressure forces is overcome by movement of the trigger to slightly raise the valve member from the valve seat, the significant pressure on the valve member is reduced to insignificance with respect to the spring leaving only the biasing force on the valve stem created by the spring member.

This effectively precludes leakage of the valve and makes it very difficult for the operator to slightly crack the valve assembly in an attempt to produce a restriction of the flow. The abrupt closing action of the valve member against the valve seat protects the valve seat and other associated parts from erosion because of high pressure high velocity fluid passing through a restricted space at the valve seat between the pressure chamber and the discharge chamber. The valve seating area within the internal gun body chamber is of a small enough size and angled so that the opening and closing forces imposed upon the valve member do not cause sticking of the valve member. Additionally, a specially designed valve stem support and extension structure essentially eliminates lateral forces on the valve stem, thereby further prolonging the useful life of the overall shut-off valve means and facilitating the elimination of wasteful supply water dumpage.

An improved upper high pressure seal member cooperates with the walls of the passageway at the upper end of the pressure chamber and the valve stem, and together with a removable plug member circumscribing the valve stem which keeps the seal in place, prevents leakage from the pressure chamber. The improved seal comprises a base wall having a flat outer surface to be supported against a surface of the plug member, and an inside surface, the base wall having a resilient central opening having a circumscribing valve stem contact edge slightly larger in diameter at the outer surface and tapered towards the valve stem, being thicker than the base wall thickness and formed in a cone-shaped lip resiliently deformed in assembly around the valve stem in an interference fit.

The base wall of the seal member has an inwardly turned right angle depending peripheral flange all around to seal the wall of the pressure chamber bore, the transition between the base wall and the flange being generally smoothly arcuate. The depending flange on the seal extends substantially further from the bottom surface of the base wall of the seal than the height of the circumscribing contact edge of the central opening, wherein friction between the valve stem and the circumscribing contact edge of the central opening of the seal is reduced so that the seal has a reduced tendency to distort or lockup on the valve stem shaft as the stem is slidingly reciprocated in the seal. The cone-shaped pointed edge of the contact surface of the central opening of the seal member is thicker than the thickness of the base wall and because of the taper is under compression against the sliding valve stem. The reduced friction between the seal member and the sliding valve stem shaft resulting from the configuration of the seal contributes to the effectiveness of the valve assembly because it reduces the tendency of the stem to freeze or lockup on the seal and thus permits the valve member on the valve stem to securely seat without a tendency to hang-up in a slightly cracked or open position and so allows the full effect of the unbalanced abrupt pressure induced closing force on the valve member to have full effect when the tapered area of the valve member nearly touches the contact area of the valve seat, allowing the snap-shut closing force to be effectively applied.

According to another aspect of the present invention, a safety knob is threadingly connected to an upper portion of the gun body and is attached to a plunger element which contacts the upper end of the valve stem. The plunger element may be threaded inwardly into the gun body to safely lock the valve element in its closed position in the event that the biasing spring means breaks, or otherwise become inoperative, or simply to lock the valve member in a closed position when the shut-off gun is not being used.

The invention includes as an additional safety factor a special safety bleeder valve for connection to the high pressure supply line which bleeds a relatively small quantity of fluid while the system is in use but if the supply pump is shut-off with the valve assembly closed, the safety bleeder valve will bleed the system back to atmospheric pressure independently of the amount of system pressure employed. Unlike a conventional needle valve which has closing parts that are strained under extreme high pressure which will bleed to some intermediate pressure and then close prematurely, the special safety bleeder valve continues to bleed as the pressure is continuously reduced from the operating pressure, although of course the amount of bleeder flow is reduced as a smaller and smaller head is presented to the bleeder valve during bleed-off.

The safety bleeder valve of the invention has a body having a connection for the high pressure waterline leading to an internal bore in the body for receiving a closely toleranced core, the body including at least one bleeder opening spaced apart from the fitting connection and leading from the bore to the outside of the body. A removable core member is positionable in the bore, closely toleranced to fit snugly in the bore leaving only a fine gap between the core member and the bore wall to allow controlled bleeding of high pressure water when the body is connected to a high pressure water line, including means for positioning the core member in the bore whereby high pressure water can continue to pass between the core member and the wall of the bore along the gap and out the bleeder opening to safely relieve high pressure without prematurely closing when a connected line is bled to a lower pressure. The body has a closure positionable on the body opposite the inlet end which may function as a means for positioning the core member in the bore. The core member is preferably an elongate core member substantially more than half the length of the body.

BRIEF DESCRIPTION OF THE DRAWINGS

FIG. 1 is a partially sectioned side elevation view of a high pressure water shut-off gun having the improved valve assembly;

FIG. 2 is an elevational cross-section enlarged to show the valve member and valve seat;

DETAILED DESCRIPTION OF THE DRAWINGS

Figure 3:
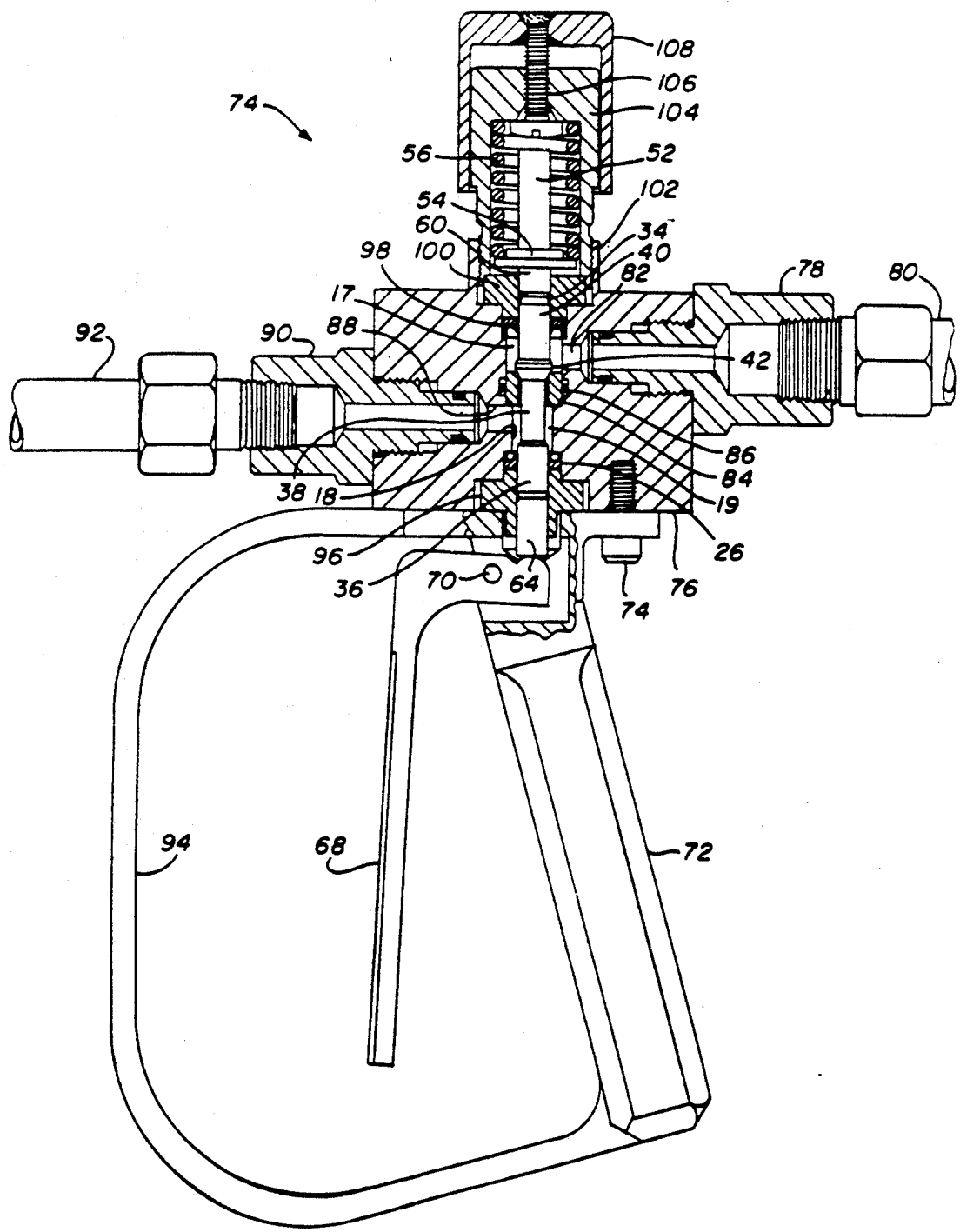
FIG. 3 is a partially sectioned side elevational view of the high pressure shut-off gun incorporating the valve assembly showing the improved upper seal member positioned in the pressure chamber and the improved safety lock.

Illustrated in the drawing is a high pressure water shut-off gun 10 which embodies principles of the present invention and is utilized to selectively initiate and terminate high pressure water flow from the discharge end 12 of a high pressure water supply conduit to a discharge conduit 14 leading to a high pressure water discharge nozzle (not illustrated). The shut-off gun 10 includes a valve body 16 having an interior passageway 18 extending vertically there through. Adjacent its upper end, the passageway opens horizontally outwardly through the body 16 via an inlet passage 20 into which the discharge end 12 of the high pressure water supply conduit may be threaded or otherwise suitably connected. The interior passageway 18 also opens horizontally outwardly through the body 16 via a discharge passage 22 into which the inner end of the discharge conduit 14 may be threaded or otherwise suitably connected. Upper and lower annular seal structures 24 and 26 are captively retained within upper and lower end portions of the passageway 18 by upper and lower annular seal retainer members 28, 30 threaded into upper and lower ends of the body 16. Captively retained within the passageway 18, vertically between the passages 12 and 14, is an annular valve seat structure 32. Valve seat 32 divides the passageway into a pressure chamber 17 containing the inlet and a discharge chamber 19 containing the outlet.

A water shut-off valve assembly means are operatively disposed within the interior passageway 18 and includes a vertically disposed valve stem 34 which extends axially through the lower seal retainer 30, the lower seal 26, the valve seat 32, the upper seal 24, and into the upper seal retainer 28. As illustrated, the valve stem 34 has a lower end portion 36 slidably received within an upper portion of the lower seal retainer 30, a radially reduced longitudinally intermediate portion 38, and an upper end portion 40 slidably disposed within a lower portion of the upper seal retainer 28. The valve means also includes a radially enlarged, generally annular valve member carried by the valve stem that defines a valve member 42 which is positioned above the radially reduced stem portion 38 and has a downwardly and radially inwardly tapering seating surface 44. As best seen in FIG. 2 valve seat structure 32 includes a wall sealing ring 33 to prevent leakage between the wall of the passageway and the valve seat structure 32 which rests upon a ledge created by an enlarged portion of the passageway 18 as indicated. Valve seat 32 includes an annular seating area 39 for receiving a seating portion of valve member 42 for sealing the pressure chamber from the discharge chamber in the closed position of valve member 42 against valve seat 32. Valve member 42 is carried by the intermediate portion 38 of valve stem 34 and effectively divides or separates the intermediate portion 38 of valve stem 34 from the upper end portion 40. Between valve seat 32 and the intermediate portion 38 of the stem is a flow passage 37 for passage of pressurized fluid from the pressure chamber 17 through the valve seat into the discharge chamber. The central opening of the valve seat which defines the flow chamber is preferably slightly larger than the valve stem to permit assembly and removal of the valve stem through the central opening of the valve seat 32. The longitudinal axis of valve stem 34 is centered in passageway 18 and centered in valve seat 32.

Extending upwardly from the top end of the valve body 16 is an annular, internally threaded collar 46 into a top end of which is threaded a hollow cylindrical spring housing 48 having an open lower end and a top end wall 50. A spring guide shaft 52 is coaxially disposed within the spring housing 48 and has a lower end slidably received within an upper portion of the upper seal retainer member 28. Just above the upper seal retainer member 28, the shaft 52 is provided with an annular radial enlargement 54. As illustrated, a cylindrical compression spring element 56 is coaxially disposed within the spring housing 48 and bears at is opposite ends against the underside of the top end wall 50 and an upper side surface of the annular enlargement 54.

Threaded into a circular opening 58 formed in the top end wall 50 is a cylindrical stop member 60 having an enlarged knob 62 fixedly secured to its upper end.

Slidably received within lower portion of the lower seal retainer 30 is a cylindrical. aluminum bronze valve stem extension member 64 which projects downwardly beyond the lower seal retainer 30. The lower end of the extension member 64 is engageable by a portion 66 of a manually operable trigger lever member 68 pivotally secured ar 70 to an angled body extension portion 72 secured at its upper end to the body 18 by screws 74.

As illustrated, the spring 56 exerts a downward biasing force on the enlarged annular portion 54 of the first shaft or valve stem section 52 whose lower end engages the upper end portion 40 of the second valve stem section 34, thereby axially biasing the stem 34 in a downward direction to thus bias the valve member 42 downwardly toward its closed position in which it seats against the valve seat structure 32 to preclude high pressure supply water flow through the gun body 16. Additionally, this downward biasing forces the lower end 36 of the second valve stem section 34 into engagement with the third valve stem section 64; biases the third valve stem section or extension member 64 into engagement with the trigger portion 66 to pivotally bias the trigger lever member 68 to its solid line position.

However, when an operator grasps the body extension portion 72 and squeezes the trigger lever member 68, the trigger lever member is pivoted in a counterclockwise direction to its dotted line position, thereby pushing the second valve stem section 34 upwardly to raise the valve member 42 off the valve seat 32 and move the valve member to its open position in which a throughflow of high pressure water is initiated through the body 16 and to the discharge nozzle. Such upward movement of the second valve stem section 34, of course, compresses the spring 56.

A subsequent release of the trigger lever member 68 allows the biasing force of spring 56 to return the trigger lever member 68 from its dotted line position to its solid line position and again moves the valve member 42 toward its closed position in which it seats against the valve seat structure 32 and terminates the through low of high pressure water.

The sudden abrupt sealing force which is pressure induced and which drives the valve member 42 against the valve seat 32, is a function of the relative diameters of the effective seating contact area, the stem diameter in the upper seal and the configuration of the valve member. Some experimentation may be necessary to achieve a desired pressure induced closing force in a particular high pressure valve assembly application.

When the valve member is closed against the seat under pressure, the discharge chamber will be at a lower pressure because it is connected to a nozzle having a restricted opening. To give some idea of the desired forces, it has been found that shut-off guns having a range of approximately ten thousand to twenty thousand psi had valve members and valve seats configured to generate approximately forty pounds of pressure induced axial closing force on the valve member, which partially extends into the pressure chamber 17 in the closed position. As sufficient force is applied to the trigger 68 to begin to raise the valve stem and consequently raise the valve member 42, a dynamic condition is created with a pressure difference between the pressure chamber above the valve member as compared to below the valve member, caused by the flow at the seat through the flow opening into the discharge chamber.

An initial closing force due to the pressure on the valve member in the vicinity of approximately forty pounds of force to be overcome is found to be reduced to only about four percent of its initial value if the valve member 42 is raised about fifteen thousandths of an inch above its contact with valve seat 32. Raising the valve stem beyond this reduces it still further. It very quickly becomes insignificant relative to the biasing force of the spring 56. With the valve member raised only slightly above the valve seat, the closing force provided by biasing spring 56 may be only five pounds or so. This means that once the valve member is raised slightly above the valve seat the pressure is equalized around the valve member and any pressure induced axial closing force becomes insignificant. Once the operator overcomes the initial closing force due to the valve member, he can retain the gun in the open position for use contending only with the biasing force of the spring which produces only a relatively small closing force to be overcome.

When the operator releases the trigger bringing the valve member 42 close to the seating area 39, he cannot hold it in that position because the sudden abrupt closing force resulting from the pressure in the pressure chamber snaps the valve closed against the seat. This provides a secure closed position and prevents the operator from cracking the valve unless he is willing to overcome the example forty pounds of closing force. Since leakage is reduced to a very low level because the valve is securely shut, there is a significantly reduced tendency for the valve seat and valve member to erode. Erosion can rapidly lead to destructive erosion rapidly tearing away at the valve assembly structure. Eroded valve seats are dangerous in these high pressure guns because of the loss of complete shut-off control and the possibility of rapid destructive failure.

The valving structure just described is configured and operative to advantageously permit the valve structure to remain in its closed position for extend periods of time, against the full supply water pressure, without the previous necessity of continuously dumping high pressure supply water to atmosphere during such extended periods. It will be noted that the interior diameters of the upper and lower annular seals 24, 26 are equal so that when the valve member 42 is raised to its open position, the oppositely directed axial water pressure forces imposed upon the valve stem 34 and the valve member 42 are essentially balanced. Accordingly, when the valve member is in its open position, the only net axial force exerted on the valve stem 34 is that exerted thereon by the spring 56. This makes it quite easy for the operator to manually hold the valve member in its open position despite the extremely high pressure of the water being flowed through the gun body 16.

Another factor helpful in the elimination of continuous high pressure water dumping during extended valve closure periods is the unique manner in which the second valve stem section 34 is supported for axial movement within the chamber 18. It can be seen that the opposite ends of the second valve stem section 34 are recessed into the interiors of the upper and lower seal retaining members 28, 30 and are engaged by both the lower end of the first stem section or shaft 52 and the third valve stem section or extension member 64 which are slidably received in outer end portions of the interiors of the seal retainer members. Accordingly, there is substantially no lateral force imposed upon the second valve stem section 34 at any time during irs upward and downward opening and closing movements. Any lateral forces imposed on either extension member are effectively precluded from being transmitted to the valve stem. This feature of the present invention also strengthens and prolongs the life of the shut-off valve structure and helps eliminate the necessity of high pressure water dumpage to atmosphere.

According to another feature of the invention, the knob 62 and the stop member 60 define safety means for selectively locking the valve stem 34 in a position maintaining the valve member 42 in its closed position in the event, for example, that the spring 56 becomes broken or otherwise inoperative, or to simply lock the valve member in its closed position when the shut-off gun is not being used.

As illustrated in the drawing, with the stop member 60 in its normal position, its lower end is positioned somewhat above the upper end of the spring guide shaft 52 when the valve member 42 is in its closed position. Accordingly, when the trigger lever member 68 is pivoted from its solid line position to its dotted line position to raise the valve stem 34, the upper end of the shaft 52 is free to be moved upwardly to permit opening or the valve member 42. However, if the spring 56 becomes broken, or otherwise inoperative, or it is simply desired to lock the valve member 42 in irs closed position, the knob 62 is simply rotated to threadingly advance the lower end of the stop member 62 into the interior of the spring chamber 48 until it firmly engages the upper end of the shaft 52 to preclude upward movement of the valve member 42 from its closed position, thereby positively locking the valve member in such closed position.

In FIG. 3 is a cross-sectional cutaway view of an improved version of the gun shown in FIG. 1. The gun is generally identified by the reference numeral 74. Many of the components are the same and will be identified by the same reference numerals. (Minor differences may exist).

The gun of FIG. 3 has a valve body 76 having an inlet fitting 78 for a high pressure line 80. Fitting 78 is connected to the valve body 76 and sealed in an opening leading to an inlet 82 leading to pressure chamber 17. Pressure chamber 17 is formed in passageway 18 in valve body 76 by valve seat 84 which is identical to valve seat 32 except it is shown having a chamber wall seal 86 recessed into the chamber wall. Valve seat 84 separates pressure chamber 17 from discharge chamber 19 as before. Discharge chamber 19 has an outlet 88 leading to a connector 90 for a nozzle extension 92 leading to a nozzle. Connector 90 is securely mounted in the valve body 76 and sealed from leakage. With the valve assembly open, a complete flow through passage is formed between the inlet and outlet to the nozzle.

A trigger 68 is pivotally connected at 70 to a body extension 72 secured to the body with bolts 74. Body extension 72 is provided with a guard 94 which protects the trigger from being accidentally operated and protects the operator's hand. Trigger 70 operates against an aluminum bronze extension member 64 fitted for reciprocation in the outboard end of lower retainer member 96. Retainer member 96 receives in a central opening the lower end portion 36 of a valve stem generally designated 34. Valve stem 34 has an upper end portion 40 and an intermediate reduced cross-section portion 38. Valve member 42 is carried by the valve stem and separates its upper end portion from the intermediate reduced portion. Valve stem 34 is centered in the passageway, circumscribed by the valve seat 84, centered about the longitudinal axis of the valve stem. An improved upper seal 98 and conventional lower high pressure seal 26 circumscribe the valve stem at its upper and lower portions. The upper end portion 40 of the valve stem is received in a centralized opening of upper retainer member 100 which has a flat innermost surface normal to the longitudinal axis of the stem across the full width of the upper pressure chamber for supporting improved seal 98.

In operation the gun functions exactly like the gun shown in FIG. 1 except that it has slightly different configuration, the improved upper seal and a modified safety shut-off. The valve body has a collar 102 which is threaded to engage the spring housing 104 which at its upper end has a threaded member 106 secured to cap member 105. Spring housing 104 has a cavity containing spring 56 and a centralized spring guide shaft 52 having annular enlargement 54 and stop member 60. Spring 56 through the enlarged portion 54 and the stop member 60 contacts the upper end of valve stem 34 to bias the valve stem downwardly to place valve member 42 in closed position against valve seat 84. By rotating the cap 105, member 106 comes in contact with the end of spring guide shaft 52 to lock the valve stem 34 in the closed position or conversely to release it when the cap member is unscrewed. Improved seal member 98 is best seen in FIGS. 4 and 5.

Figure 4:
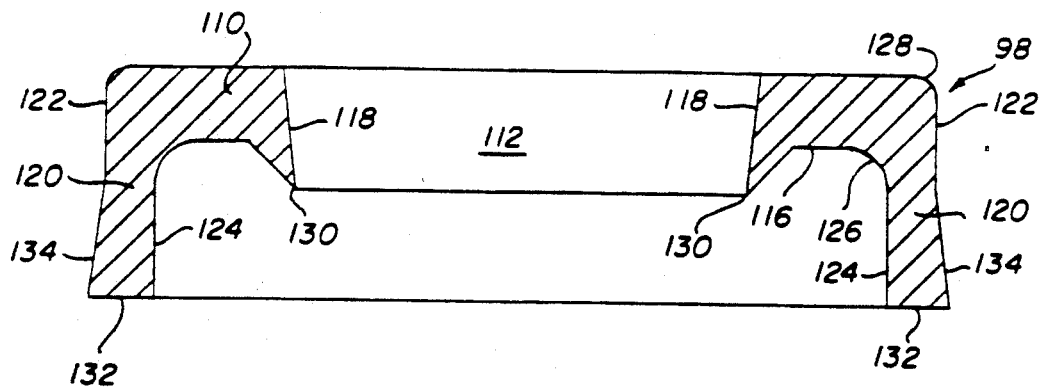
FIG. 4 is an enlarged cross-sectional view of the improved seal member.
Figure 5:
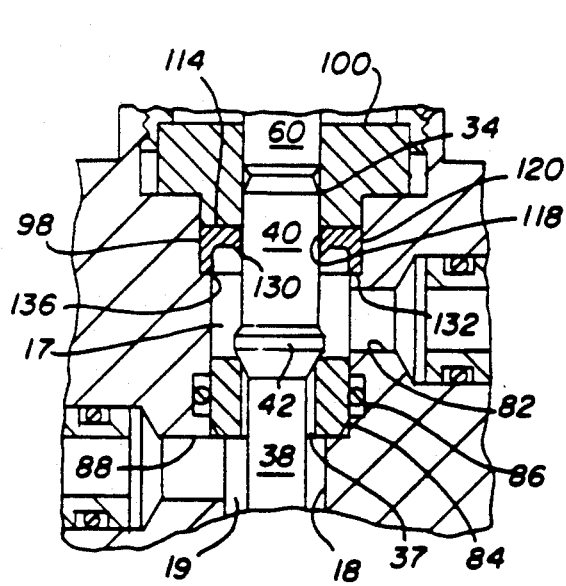
FIG. 5 is an enlarged view of the valve assembly in cross-section which employs the improved seal member to seal the pressure chamber.

In FIGS. 4 and 5 is seen the improved high pressure seal 98 in greatly enlarged and exaggerated size. It is actually about one half inch in diameter in a successful installation though it may be smaller or larger depending on valve design. Seal 98 is molded in one piece preferably from ultra high density high molecular weight polyethylene. Although it is nearly rigid it retains some flexibility to deform. Seal 98 has an end wall or base wall 110, having a central opening 112 for circumscribing a valve stem. The base wall 110 has an outside surface 114 and an inside surface 116 (with respect to applied pressure), spaced apart by the thickness of the base wall 110. The central opening 112 has a circumscribing contact edge 118, tapered from the outside surface 114 inwardly towards the inside surface of the base wall towards the central axis of the opening 112. Contact edge 118 is circular to fit the upper end portion 40 of the valve stem 34.

Contiguous with the base wall 110 is a peripheral depending chamber sealing flange 120, depending from the periphery thereof away from the bottom surface of the base wall 110 along the outside edge 122 of the flange 120, generally at right angles to the surface 114 of base wall 110. Flange 120 depends away from the base wall along an inside edge 124, also generally at right angles to the inside surface 116 of the base wall 110. The transition between the base wall 110 and the flange 120 is generally arcuate both at an inside corner 126 and at an outside corner 128. The corners referred to are of course annular with respect to the opening as the valve disclosed is circular in shape around its periphery. The improved seal is generally shaped like a shallow dish with a circular periphery.

The depending flange 120 extends substantially further from the bottom surface 116 of the base wall beyond the greatest distance of the extremity 130 of the circumscribing contact edge of the central opening, the contact edge being the part which will be compressed to create an interference fit under compression around the upper portion 40 of the valve stem shaft as indicated in FIG. 5. The extreme end of the depending flange designated 132 extends substantially further from the base than the extremity 130 of the stem contact edge 118. The depending flange is slightly thickened at the extremity 132 and slightly tapered outwardly to a greater diameter in the portion indicated as 134 than at the diameter at the transition corner 128 of the flange with the base wall 110. The base wall has a generally conical-shaped thickened tapered portion, tapered to a point at the extremity 130 on the pressure side immediately surrounding the central opening 112. The conical point is somewhat exaggerated in FIG. 4. The seal is preferably symmetrically-shaped. The end 132 of the depending flange is preferably parallel to the outside surface 114 of the base wall or base wall flange 110.

FIG. 5 shows the improved seal 98 with the circumscribing contact edge 118 compressed against the upper end portion 40 of valve stem 34. A taper of about 5 to 10 degrees on that edge has been successfully employed. Passageway 18 has an offset ledge 136 in pressure chamber 17 which supports the end 132 of the depending flange 120 of seal member 98. The outside surface 114 of seal member 98 is supported by a flat surface on upper retainer member 100 which also circumscribes valve stem 34. Corresponding support portions for improved seal 98 are found in the embodiment of FIG. I in support of conventional seals 24, 26 therein. Conventional high pressure seals generally include a internal spring means and have the same height at the center around the stem as they have at the outer edge.

Valve member 42 in FIG. 5 is configured to provide a pressure induced abrupt closing force as previously described with regard to FIG. 1. The depending flange 120 of seal member 98 is substantially longer than the length of the contact area 118 and is preferably at least two or three times or more longer than the height of the contact area 118 between the outside surface 114 and the tapered pointed extremity 130. The depending flange 120 is also compressed against the contacting side wall of passageway 118 in the uppermost portion of pressure chamber 17, which aids in securing the seal against leakage at the outside. In this regard a taper of about 5 to 10 degrees on the outside edge has been successfully employed. The uppermost portion of valve seat 84 is chambered at an angle consistent with the taper on the outside of valve member 42 to provide a valve seat contact area as indicated in FIG. 5. This is like the tapered seating surface 44 in FIG. 1. A similar flow passage 37 is provided at the intermediate reduced portion 38 of valve stem 34.

Figure 6:
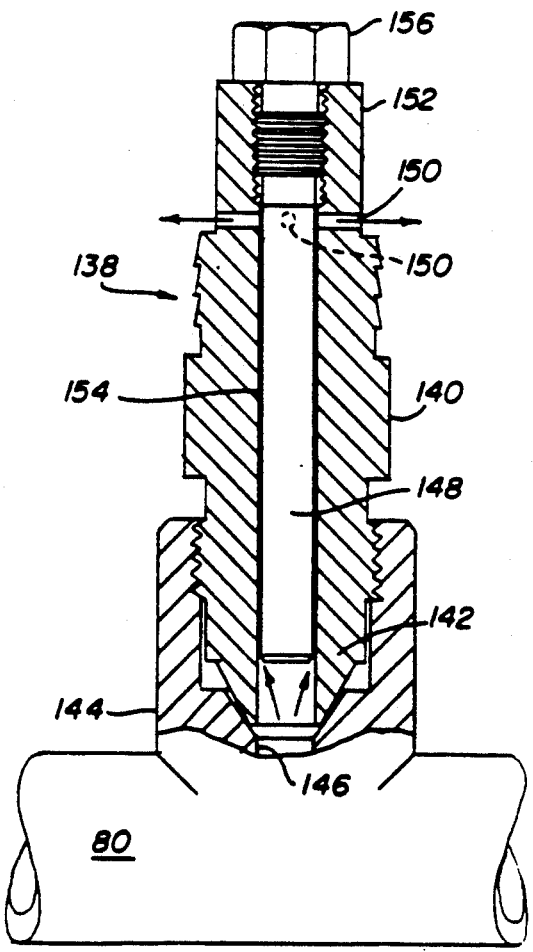
FIG. 6 is a cross-sectional view of the improved safety bleeder valve connected to a supply line.

FIG. 6 is a cross-section through the improved bleeder valve designated generally by the reference numeral 138. Safety bleeder valve 138 has a body 140 having a connection 142 at an inlet end of the body for a high pressure waterline fitting 144 of a high pressure line such as line 80. The arrows indicate the direction of flow. The connection leads to an internal bore 146 for receiving a closely tolerance core 148. The body has at least one bleeder opening 150 at an end 152 opposite the inlet connection 142. Core 140 is a removable core member positionable in the bore and being closely toleranced to fit the bore snugly leaving only a fine gap 154 between the core member 148 and the bore wall 146 to allow controlled bleeding of high pressure water when the body is connected to a high pressure waterline. Closure 156 is threaded into end 152 on the body and may include means for positioning the core member in the bore and keeping the core from being blown out of the bore by the high pressure exerted on its inlet end indicated by the arrows in FIG. 6.

As shown in FIG. 6 the means for positioning 156 may be a separate-part from core 148 or they may be of unitary construction, which is preferable because closure 156 when removed will remove the core member for ease in cleaning out any debris which may accumulate in the fine gap 154 which might otherwise interfere with the bleeder operation. When installed, a small quantity of the pressurized fluid will enter the fine gap 154 traveling along the core member where it reaches bleeder opening 150 and is allowed to drain from the system. The bore and core member are preferably elongate as shown in FIG. 6 which aids in providing a suitable flow resistant gap of a large enough size with plenty of channelizing area whereby debris in the system has less tendency to clog the safety bleeder valve. The core is self-seated generally centered in the longitudinal axis of the bore. Its exact longitudinal positioning is not critical since it is the fine gap which controls the amount of flow.

Exemplary of the construction, would be a valve wherein the fine gap between the bore and the core member is generated by a difference in diameter in the range of about a half a thousandth of an inch to a thousandth of an inch, extending all along the core member. Such a gap produces a bleed flow in the range of about one quarter to one half gallons per minute at a pressure of twenty thousand pounds per square inch. Although the flow will be correspondingly less at lower operating pressures, it can be seen that the existence of the gap 154, which provides a flow passage for the high pressure fluid, cannot close up under the influence of the high pressure. Although there is some compressive stress tending to slightly enlarge the diameter of the core member there are also corresponding hoop stresses in the body which tend to expand the opening very slightly, but the fine gap continues to perform its bleeding function essentially independently of the applied pressure. The only effect of the applied pressure is to control the absolute amount of fluid which will leak in a given period of time. The valve cannot close up because of elastic deformation once the pressure becomes reduced as is the case with needle valves. Although a needle valve might be designed which can be opened far enough where this tendency to close is corrected, the opening would provide excessive wasteful flow at the higher operating pressures. The inventive valve will continue to bleed down to atmospheric pressure so that a gun which is shut-off before the pressure is removed from the system will safely bleed itself to a safe condition, with no attention from the operator.

Figure 7:
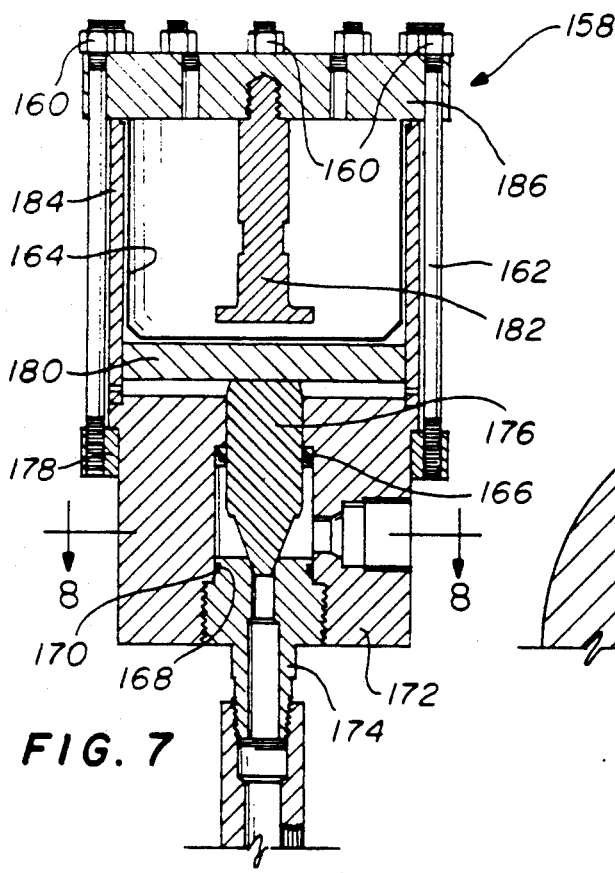
FIG. 7 is a cross-sectional view of a pressure regulator.

FIG. 7 is a cross-sectional view of a pressure regulator 158 having head mounting nuts 160 on various studs 162. The pressure regulator 158 has a diaphragm 164 and piston 180 in communication with the valve 176. Seal means 166 are provided with a backup ring 168, the backup ring being an O-ring 170. The body 172 contains the valve 176, valve seat 174. The body 172 is attached by ring 178 through stud 162 and head mounting nuts 160 to the cover 186. The piston 180 has a piston stop 182 which is contained in the cylinder 184.

Figure 8:
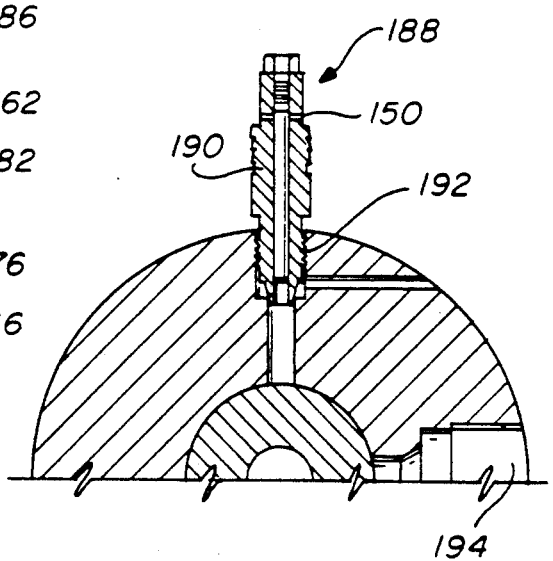
FIG. 8 is an enlarged view of a bleeder valve assembly in cross-section, positioned in the pressure regulator and taken along line 8—8 of FIG. 7.

A bleeder valve 188 is presented in FIG. 8 in an enlarged cross-sectional view. The bleeder valve 188 is positioned in the pressure regulator 158 of FIG. 7 with the enlarged view taken along line 8—8 of FIG. 7. The bleeder valve 188 has at least one bleeder opening 150 at an end opposite the inlet from the pressure regulator 158. Additional bleeder openings 190 can be located at various locations along the longitudinal bleeder valve body, for example, for utilization and lower velocity release, i.e. lower pressure adaptations. The bleeder valve is mounted in the pressure regulator 158 through a threaded slim line inlet 192.

Figure 9:
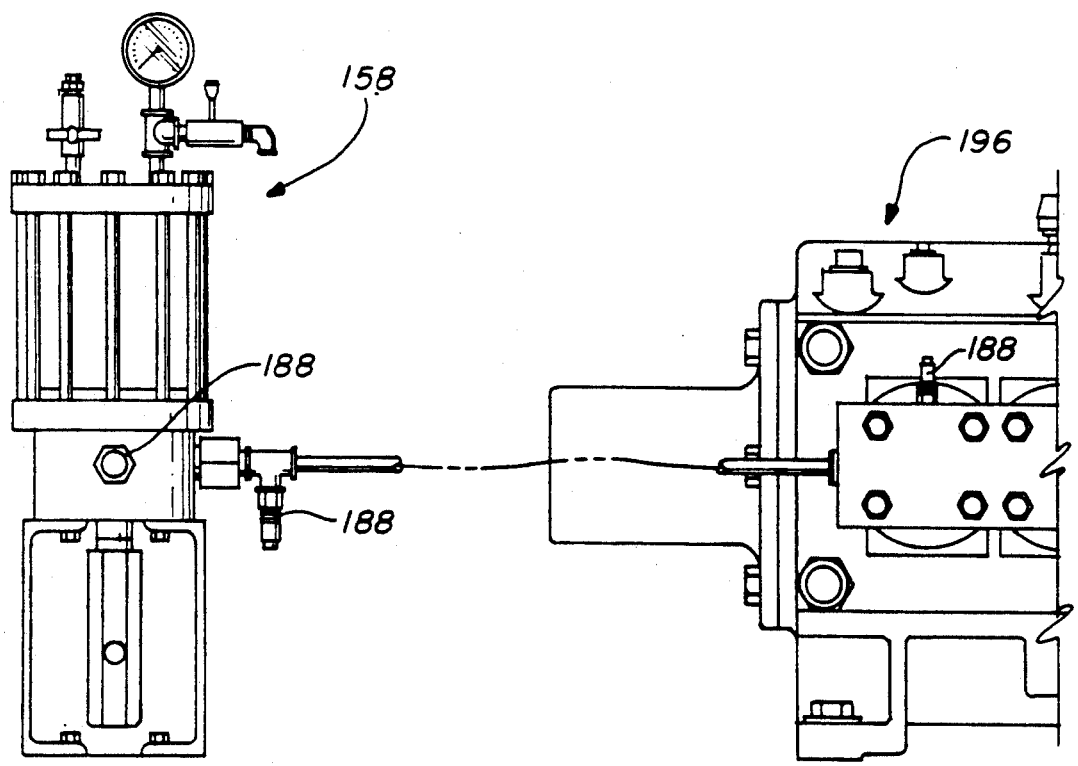
FIG. 9 is a schematic side view of a pressure regulator in communication with a high pressure fluid pump illustrating three bleeder valve utilization sites.

The schematic presentation of FIG. 9 provides a side view of a pressure regulator 158 in communication with a high pressure fluid pump 196 illustrating three bleeder valve 188 utilization sites. The bleeder valve 188 can be utilized in the pressure feed line as is shown in FIG. 6 or in direct communication with a pressure regulator body. In addition, the bleeder valve 188 can be located at the source of the pressurized fluid, i.e. the pressure pump. The source of pressurized fluid communicates with the pressure regulator 158 through pressure inlet 194 as shown in FIG. 8.

The bleeder valve in accordance with the invention includes multiple bleeder openings which can be adjusted to accommodate various pressure loads. For example, the release of from 0.1 to about 0.2 gallons per minute would accommodate pressures of less than about 10,000 psi. On the other hand, bleeder openings adjusted to allow the passage of from about 0.3 to about 0.4 gallons per minute will accommodate pressures of about 20,000 psi or less. The bleeder valve functions by producing a bleed rate dependent on the pressure requirements. The pin clearance within the bleeder valve permits, for example, about a half of a thousandth of an inch clearance so that the pressurized fluid can channel past the pin to the appropriate bleed openings. A significant advantage of the present invention versus, for example, needle valve apparatus, is that it reduces erosion due to high pressure fluid flow.

The foregoing detailed description is to be clearly understood as being given by way of illustration and example only, the spirit and scope of the present invention being limited solely by the appended claims.

I claim:

1. A high pressure shut-off gun for use in controlling water pressure exceeding at least 1000 psi, said gun being operable to selectively initiate and terminate water outflow from the discharge end of a high pressure water supply conduit, said shut-off gun comprising:

a body having an internal chamber opening outwardly through said body via an outlet passage operatively connectable to a water discharge nozzle, and via an inlet passage operatively connectable to said high pressure water supply conduit to receive a flow of high pressure water therefrom;

a valve stem axially extending through said internal chamber and being axially movable therein, said stem comprising at least first and second separate sections in axial alignment;

a valve seat structure positioned within said internal chamber and circumscribing said second stem section;

a valve member integrally formed with said second stem section for axial movement therewith within said internal chamber between an open position in which said valve member is moved away from said valve seat to thereby point a throughflow of high pressure water from said inlet passage to said outlet passage, and a closed position in which said valve member is operatively engaged with said valve seat structure to preclude such throughflow;

spring means for biasing said valve member toward its closed position;

manually operable means for axially moving said valve stem to selectively move said valve member away from its closed position against the biasing force of said spring means; and said valve member being configured and supported such that, when the valve member is in its open position, the opposite axial pressure forces thereon are essentially balanced so that the only appreciable axial force on said valve stem is that exerted by said spring means, the effective seating area of said valve seat structure being sized such that the net effect of the spring bias and the full supply water pressure on all exposed surfaces of the valve member within said internal chamber is a significant but manually reversible force or sealing pressure in the closing direction just as the valve member is closed, said manually reversible force being substantially greater than the biasing force of said spring means to provide for a snap action operation of the valve, only said manually reversible sealing pressure and relatively smaller biasing force of the spring means continuing on said valve member in its closed position even though water pressure in excess of at least 1000 psi is maintained in said inlet passage, thereby enabling closure of the valve for extended periods of time without the necessity of continuously dumping high pressure supply water to atmosphere during such extended periods.

2. The shut-off gun of claim 1 further comprising:

safety means selectively movable into and out of engagement with said valve stem and selectively operable to lock said valve member in its closed position in the event that said spring means become broken or otherwise inoperative.

3. The shut-off gun of claim 1 further comprising:

a third stem section separate from and in axial alignment with said first and second stem sections, said first and third stem sections supporting said second valve stem section for axial movement thereof relative to said body in a manner essentially preventing said second valve stem section from being subjected to lateral forces by said manually operable means for said spring means.

4. A valve assembly capable of controlling water in excess of at least 1000 psi for use in a high pressure water gun of the type having an internal passageway having a high pressure inlet supply connection and a discharge connection, the internal passageway including a pressure chamber which can be opened or closed by a valve for flow or shut-off to stop flow between the pressure chamber and a discharge chamber in the passageway leading to the outlet of the gun, the improvement comprising:

- a valve body having a hollow passageway with upper and lower ends and having a high pressure water inlet and a discharge outlet;
- a removable valve seat dividing the passageway into a pressure chamber containing the inlet and a discharge chamber containing the outlet and having a valve seating area;
- a valve stem having upper and lower portions and passing through the valve seating area and being sealingly mounted in the hollow passageway for axial reciprocation therethrough;
- a valve member on the valve stem in the inlet chamber for selectively engaging the valve seating area to close the valve;
- a valve spring applying a force biasing the valve stem toward the closed position of the valve member against the valve seat; and
- the valve member being configured to generate a substantial manually reversible pressure induced closing force in response to high operating pressure in excess of at least 1000 psi shortly before the valve member closes against said seat, said pressure induced force being substantially greater than the spring force bias applied to the valve stem and being relieved to relative insignificance immediately upon movement of the valve member away from the valve seat to provide a snap-shut and a snap-open control action which prevents leakage and erosion of the valve seat and which when said valve is opened becomes significantly less than the biasing spring force which an operator must continually overcome during operation of the gun.

5. The valve assembly of claim 4 wherein the face of the valve member is configured in a cone-shape with a tapered contact surface for closing into the valve seat, having a portion of such tapered contact surface overhanging the valve seating contact area in the pressure chamber which in combination produces the unbalanced pressure induced closing force just as the valve member almost touches the seat, which pressure force continues during seating and becomes balanced just as the valve member leaves the seat, the valve stem then being biased essentially only by the biasing spring after the valve member is manually unseated and moved away from the valve seat toward the open position.

6. The valve assembly of claim 5 wherein the cross-sectional areas of the upper and lower portions of the valve stem are equal so that axial pressure induced forces on the valve stem remain balanced when the pressure and discharge chambers are at substantially the same pressure, the valve seat being slightly larger in cross-sectional area than the lower portion of the valve stem to facilitate insertion of the valve stem through the circumscribing valve seat.

7. The valve assembly of claim 6 wherein a reduced cross-sectional area of the valve stem between the valve member and the lower portion of the valve stem forms a flow passage through the valve seat and at least part of the discharge chamber.

8. The valve assembly of claim 4 wherein the valve stem and pressure chamber are slidingly pressure sealed by an improved seal member having a central opening compressible around the upper portion of the stem, the central portion of the seal being formed in a flattened base flange oriented normal to the axis of the stem, the central opening having a thickened tapered lip extending from the pressure side against the stem in sealing contact therewith, the central base flange having a peripheral right angled flange depending towards the pressure side in sealing contact with the passageway and extending substantially beyond the greatest extension of the central opening of the seal to reduce the amount of sliding resistance and deformation of the seal in contact with the stem.

9. The valve assembly of claim 5 wherein the valve stem and pressure chamber are slidingly pressure sealed by an improved seal member having a central opening compressible around the upper portion of the stem, the central portion of the seal being formed in a flattened base flange oriented normal to the axis of the stem, the central opening having a thickened tapered lip extending from the pressure side against the stem in sealing contact therewith, the base flange having a peripheral right angled flange depending towards the pressure side in sealing contract with the passageway and extending substantially beyond the greatest extension of the central opening of the seal to reduce the amount of sliding resistance and deformation of the seal in contact with the stem.

10. The valve assembly of claim 9 wherein the cross-sectional areas of the upper and lower portions of the valve stem are equal so that axial pressure induced forces on the valve stem remain balanced when the pressure and discharge chambers are at substantially the same pressure, the valve seat being slightly larger in cross-sectional area than the lower portion of the valve stem to facilitate insertion of the valve stem through the circumscribing valve seat.

11. The valve assembly of claim 10 wherein a reduced cross-sectional area of the valve stem between the valve member and the lower portion of the valve stem forms a flow passage through the valve seat and at least part of the discharge chamber.

12. The valve assembly of claim 4 wherein the upper part of the valve body has a safety housing for the safety means, the safety means including a member threaded in the housing to engage an end of the valve stem and a rotary member secured to the member threaded in the housing for selective engagement and disengagement of said member with the end of the valve stem whereby the valve stem can be locked in closed position or unlocked for operation, by rotation of the rotary member.

13. The valve assembly of claim 4 wherein the upper and lower ends of the valve body passageway are closed by removable closing means including means for supporting said valve stem for axial movement in a manner essentially preventing lateral movement of the valve stem when the valve stem is reciprocated.

14. The valve assembly of claim 13 wherein the removable closing means are plug members secured in the upper and lower ends of the passageway of the valve body and having an annular surface circumscribing the respective upper and lower portions of the valve stem for supporting the upper and lower high pressure seals.

15. A valve assembly for controlling flow of water at pressures in excess of at least 1000 psi, in a high pressure water gun of the type having an internal passageway having a high pressure inlet supply connection and a discharge connection, the internal passageway including a pressure chamber which can be opened or closed by a valve for flow or shut-off to stop flow between the inlet and discharge connections of the gun, the improvement comprising:

a valve body having a longitudinal passageway divided into a pressure chamber connected to an inlet opening and a discharge chamber connected to an outlet opening, the chambers being separated by a removable valve seat mounted in the body between the chambers;

a valve stem mounted for axial reciprocation in the passageway by an upper sealing means for sealing the pressure chamber and lower sealing means for sealing the discharge chamber, the upper portion of the valve stem extending through the upper sealing means and the lower portion of the valve stem extending through the lower sealing means for sliding reciprocation;

a valve member carried by the valve stem in an intermediate portion of said stem in the pressure chamber between the upper stem portion and the lower stem portion, the valve member having a tapered seat contact area for contact with a cooperating valve seat contact area and a flow passage below the contact area for flow of high pressure water from the pressure chamber to the discharge chamber when the valve is unseated;

the upper sealing means including an improved high pressure seal for the wall of the pressure chamber circumscribing the upper portion of the valve stem and in sliding contact therewith, the improved upper seal comprising: a base wall having a flat outer surface to be supported by a plug member surface and an inside surface, the base wall having a resilient central opening having a circumscribing contact edge being larger in diameter at the outer surface and tapered towards the valve stem, the contact edge being thicker than the base wall thickness in a cone-shaped formation resiliently deformed in assembly around the valve stem;

the base wall having an inwardly turned right angle depending flange all around to seal the wall of the pressure chamber bore, the transition between the base wall and the flange being generally smoothly arcuate; and the depending flange extending substantially farther from the bottom surface of the base wall than the height of the circumscribing contact edge of the central opening, wherein friction between the valve stem and the circumscribing contact edge central opening of the seal is reduced so that the seal has reduced tendency to distort or lockup on the valve stem shaft as the stem is reciprocated in the seal.

16. A valve assembly for controlling flow of water at pressure in excess of at least 1000 psi, in a high pressure water gun of the type having an internal passageway with a high pressure inlet supply connection and a discharge connection, the internal passageway including a pressure chamber which can be opened or closed for flow or no flow between the inlet and discharge connection of the gun, the improvement comprising:

a valve body having a longitudinal passageway for a valve stem extending therethrough, the passageway having an upper pressure chamber with a high pressure water inlet and a lower discharge chamber having a discharge outlet;

a cone-shaped valve seat in the passageway having a reduced cross section flow opening centered in the longitudinal axis of the passageway for circumscribing a valve stem, said valve seat being located to separate the pressure chamber from said discharge chamber;

a valve stem axially arranged along the longitudinal axis of the passageway and passing through the pressure chamber, the discharge chamber and the valve seat, the valve stem having an upper portion, a center portion and a lower portion spaced apart from the center portion, the valve stem being axially movable in sliding contact with high pressure seals at the upper portion and at the lower portion, including a high pressure seal sealing the upper portion of the upper pressure chamber and a high pressure seal sealing the lower portion of the discharge chamber;

a spring means for biasing said valve stem toward a closed position in relation to the valve seat;

a valve member integrally formed with and carried by the center portion of the valve stem for axial movement therewith, said valve member having first and second tapered ends, the first tapered end operably cooperating with the corresponding cone-shaped surface on the valve seat to close the flow opening of the valve seat and seal the pressure chamber, the second tapered end of the valve member being located totally within the pressure chamber and providing a significantly unbalanced force directed in the closing direction of the valve member to snap the valve member closed against the seat as the valve member very closely approaches the seat; and the first and second tapered ends of the valve member forming an insignificant pressure imbalance on the valve stem when the valve is in the open position.

* * * * *